(12) United States Patent
Hehl

(10) Patent No.: US 6,287,104 B1
(45) Date of Patent: Sep. 11, 2001

(54) MECHANICAL SAFETY COVER INTERLOCK FOR AN INJECTION-MOLDING MACHINE

(76) Inventor: Karl Hehl, Arthur-Hehl Strasse 32, D-72290 Lossburg (DE)

(*) Notice: Subject to any disclaimer, the term of this patent is extended or adjusted under 35 U.S.C. 154(b) by 0 days.

(21) Appl. No.: 09/404,154

(22) Filed: Sep. 27, 1999

Related U.S. Application Data

(63) Continuation-in-part of application No. 09/014,704, filed on Jan. 28, 1998, now abandoned.

(51) Int. Cl.⁷ .................................................. B29C 45/84
(52) U.S. Cl. .................. 425/136; 425/151; 425/DIG. 45
(58) Field of Search ..................................... 425/136, 138, 425/151, 152, 153, DIG. 45

(56) References Cited

U.S. PATENT DOCUMENTS

| | | | |
|---|---|---|---|
| 3,728,057 | * | 4/1973 | Grundmann et al. . |
| 3,734,664 | * | 5/1973 | Bosyk . |
| 3,771,936 | * | 11/1973 | Moslo . |
| 4,113,414 | * | 9/1978 | Hehl . |
| 4,162,878 | * | 7/1979 | Puglisi et al. . |
| 4,340,346 | * | 7/1982 | Hehl . |
| 4,373,890 | * | 2/1983 | Hehl . |
| 4,382,763 | * | 5/1983 | Hehl . |
| 5,277,568 | * | 1/1994 | Hirata et al. . |
| 5,834,036 | * | 11/1998 | Ueno . |

* cited by examiner

*Primary Examiner*—Tim Heitbrink
(74) *Attorney, Agent, or Firm*—Venable Law Firm

(57) ABSTRACT

A mechanical safety cover interlock for an injection-molding unit has a protective device that covers the mold clamping area. As soon as the protective device is moved from its protecting position, a sensor for an auxiliary circuit emits an electrical signal. As a result of the electrical signal, a control element uses the force of elastic means to steer blocking mechanisms into a blocking position with a blocking section of a locking rod, which hinders the movement of the movable mold carrier when in the blocking position. The position of the control element is monitored with the aid of a position monitoring arrangement.

19 Claims, 9 Drawing Sheets

MECHANICAL SAFETY COVER INTERLOCK FOR AN INJECTION-MOLDING MACHINE

CROSS-REFERENCE TO RELATED APPLICATION

This application is a continuation-in-part of application Ser. No. 09/014,704 filed Jan. 28, 1998 now abandoned.

BACKGROUND OF THE INVENTION

1. Field of Invention

The present invention concerns a mechanical safety cover interlock for an injection-molding machine for the processing of plasticizable masses, e.g. plastic materials, pulverized and ceramic masses and, in particular it concerns a control device for interrupting the operation of the machine as soon as a protective device is moved from its protecting position. Such a machine includes a stationary mold carrier; a clamping unit; a movable mold carrier which can be moved by the clamping unit in an axial direction parallel to a mold closing direction of the machine from and to a position of interlock with the stationary mold carrier; a mold clamping area extending between the movable mold carrier and the stationary mold carrier in which parts of a mold can be fixed on the movable mold carrier or the stationary mold carrier; a support element, arranged behind the movable mold carrier as seen from the stationary mold carrier, for supporting the clamping unit for the movable mold carrier; force transmission elements for transmitting forces occurring in a closed position from the stationary mold carrier to the support element and thus to the movable mold carrier; a protective device that covers the mold clamping area while in a protecting position and which is movable in the axial direction; a locking rod extending in the axial direction and including a blocking segment; a mechanical block mechanism operating jointly with the blocking segment of the locking rod and including blocking means for blocking movement of the movable mold carrier by engagement with the blocking segment, the blocking means being movable counter to the force of an elastic means to be in a non-blocking position and, when located in the non-blocking position, being movable relative to the locking rod during a movement of the movable mold carrier; and a control device which positively engages the blocking means with the blocking segment of the locking rod when the protective device is moved from the protecting position and which permits the movement of the locking rod relative to the blocking mechanism when the protective device is in the protecting position.

2. Description of the State of the Technology

Injection-molding machines, especially plastic injection-molding machines, principally require a protective covering or protective device, which covers the mold clamping area to prevent, in particular, injuries to the operating personnel, e.g. caused through inadvertently reaching into the mechanical safety cover interlock while it is in the process of closing. When the protective device is not in the protecting position, the control circuit for the mechanical safety interlock is frequently opened so that a closing of the mold is no longer possible. In many cases, the hydraulic circulation for the mechanical safety cover interlock is also interrupted dependent upon the movement of the protective device, so that there is no danger to the operator, even if the switching unit for opening the control circuit malfunctions. A blocking mechanism for the mechanical safety cover interlock then ensures that if these safety precautions fail, a closing of the mold is no longer possible by virtue of an additional, separate safety system.

Mechanical safety cover interlocks of the above-outlined type are known, for example, from the U.S. Pat. Nos. 4,340,346 and 4,373,890. These mechanical safety cover interlocks comprise forcibly controlled, purely mechanical blocking mechanisms for the mold closing movement, having at least one locking rod attached to the movable mold platen and extending parallel to the closing direction. The locking rod extends through a bore in a platen located adjacent to the movable mold platen. There, a blocking mechanism is provided, which operates jointly with the locking rod by means of a control rod for the protective cover. However, these mechanical safety cover interlocks cannot detect, whether the blocking mechanism is in fact working, as only the position of the protective cover is detected.

U.S. Pat. No. 4,373,890 discloses locking jaws which permit an engagement at any time with the locking rod having annular ribs. For this purpose, the engagement elements on the locking jaws are displaced against each other in the direction of the locking rod. The positioning of the locking jaws occurs by means of a control element acting jointly with control wheels. As a result of a profile change in the control element, the control wheels are forced toward the outside, resulting in a movement of the two locking jaws with the assistance of transfer levers. A plurality of springs are used for the resetting. The control element is articulated, so that it is of no significance as to which part of the locking jaw first engages in the locking rod.

U.S. Pat. No. 4,382,763 discloses a mechanical safety cover interlock which does not only mechanically block the movement of the mold closing unit, but it also provides electronic signal detecting, whether the protective cover is in the protecting position. However, this electronic signal is only used to shut down the mold closing unit. Nevertheless, the possibility would exist, that the mechanical blocking mechanism is not working properly, so that a risk for the user would still exist, as the function of the blocking mechanism itself is not tested.

SUMMARY OF THE INVENTION

Based on the above-described prior art, it is an object of the present invention to modify a mechanical safety cover interlock of the aforementioned generic type in such a way that the design of the blocking mechanism is simplified and thus can be configured in a more cost-effective way.

The above and other objects are accomplished in the context of a mechanical safety cover interlock for an injection-molding machine of the type first described above, wherein according to the invention, the control device includes a sensor for detecting whether the protective device is in the protecting position and for emitting an electrical signal when the protective device is not in the protecting position; and a control element for steering the blocking means into the blocking position in response to the electrical signal and the force of the elastic means; and wherein the interlock further includes a position monitoring means for monitoring the position of the control element.

As compared to the prior art, the blocking mechanism is modified in that the control device, which moves the blocking means into and from the blocking position, is not activated only mechanically; rather, an auxiliary control circuit is additionally provided. Such a circuit detects, with the aid of a sensor, whether or not the protective device is in the protecting position. If this is not the case, the auxiliary circuit produces an electrical signal and steers the control element into the blocking position by the force of elastic means in response to the electrical signal. The position of the control element is also monitored for safety reasons, thus making it possible to omit mechanical control rods which can hinder access to the mold clamping area. This eliminates purely mechanical operations that previously required an additional application of force by the user during the opening of the protective device since a sensor detects whether the protective device is in the protecting position. Nevertheless, it is possible to provide for a forced blocking, caused by the elastic means, as soon as the respective signal is generated and to provide for a positive safety measure by means of the additional monitoring of the position of the control element in case the protective device opens, which safety measure cannot be deactivated easily because of the multiple safeguards.

If, according to a further feature of the invention the control element is designed as a control fork that positively guides the control wheels necessary for positioning the locking jaws, then the blocking mechanism can have a simpler design as compared to conventional arrangements, since it is no longer necessary to provide a plurality of springs or other elastic means.

BRIEF DESCRIPTION OF THE DRAWINGS

These and other features and advantages of the invention will be further understood from the following detailed description of a preferred embodiment with reference to the accompanying drawings in which.

DETAILED DESCRIPTION OF THE PREFERRED EMBODIMENT

Figure 1:
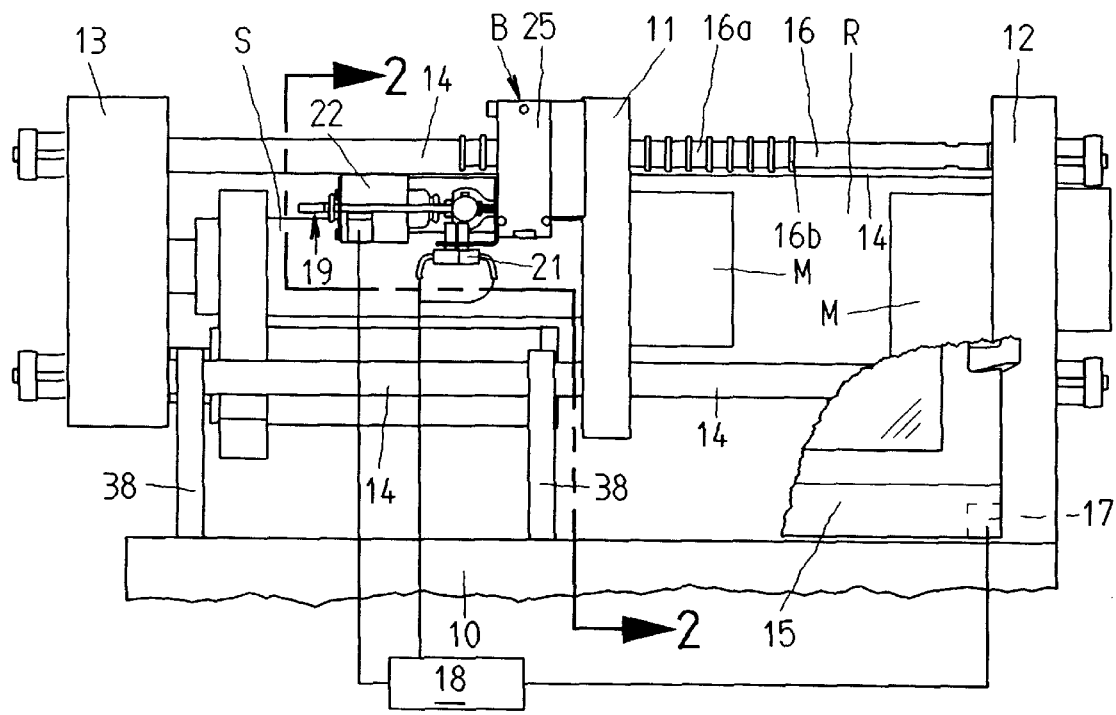
FIG. 1 is a schematic side elevational view of a mechanical safety cover interlock arranged on a machine base.

FIG. 1 shows the essential components of a mechanical safety cover interlock positioned on a machine base 10. A stationary mold carrier 12 is rigidly connected to the machine base 10. The remaining components of the mechanical safety cover interlock are positioned on supporting elements 38 and can be moved relative to these in an axial direction which is understood to be that direction in which the movable mold carrier is moved during the closing of the mold. A movable mold carrier 11 can be placed into or removed from an interlocked position with the stationary mold carrier 12 by means of a hydraulic clamping unit S. An electromechanical or another type of clamping unit can also be provided in place of the hydraulic clamping unit. A mold clamping area R is located between the movable mold carrier 11 and the stationary mold carrier 12 in which the components of a mold M can be fixed in part on the movable mold carrier 11 and in part on the stationary mold carrier 12.

Figure 2:
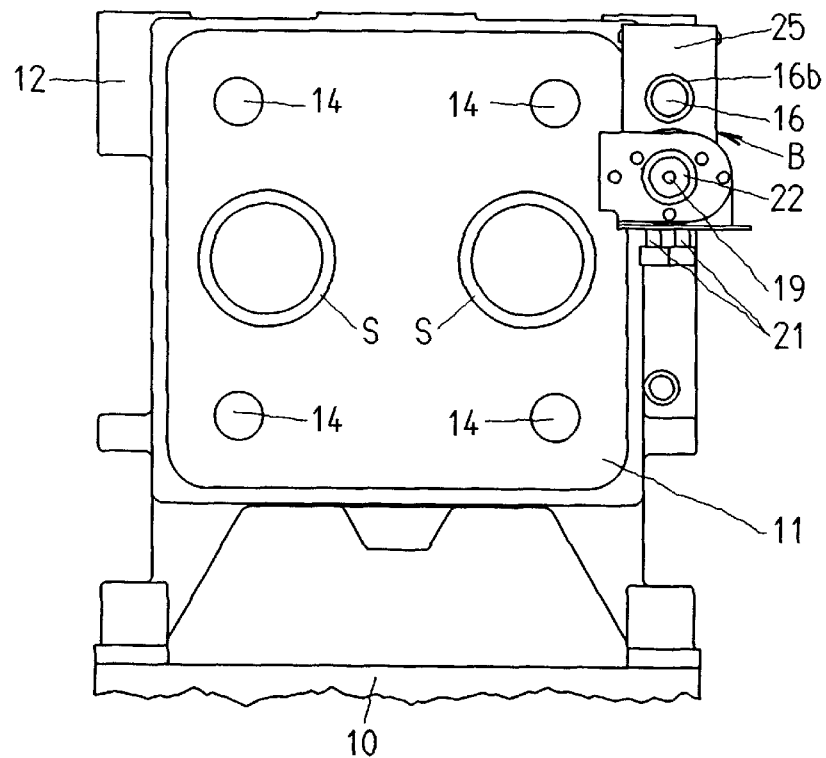
FIG. 2 is a section along the line 2—2 in FIG. 1.

As viewed from the stationary mold carrier 12, a support element 13 is located behind the movable mold carrier 11 and serves as a support for the clamping unit S. Beams 14 are provided as power transmission elements for transmitting the forces, occurring during the closed position, from the stationary mold carrier 12 to the support element 13 and thus to the movable mold carrier 11. The support element 13, the stationary mold carrier 12 and beams 14 form a force frame. The movable mold carrier 11 is guided along the beams 14, as shown in FIG. 2. In order to permit easy access, other force transmission elements can be provided alternatively which guide the occurring forces, for example, around the mold clamping area R.

At least when the machine is in operation, the mold clamping area must be covered by a protective device 15 shown schematically in FIG. 1. The protective device 15 can be moved from the protecting position in an axial direction, that is to the left in FIG. 1.

A locking rod 16 extends parallel to the axial direction. Several locking rods can also be provided if necessary. In the exemplary embodiment, the locking rod 16 is arranged such that in a horizontal projection it coincides with the projection of the upper right beam 14 according to FIGS. 1 and 2. Such an arrangement does not present an obstacle for the transfer of mold M to the mold clamping area R. A blocking mechanism B is arranged on the mold carrier so as not to weaken the latter statically. The blocking mechanism does not penetrate the mold carrier and, in accordance with FIG. 2, is arranged on the side of the mold carrier. In the exemplary embodiment, the locking rod 16 is rigidly connected to the stationary mold carrier and extends with one blocking segment 16a through the blocking mechanism B. Alternatively, the locking rod can also be arranged on the support element 13. As known from the prior art, it is also possible to move the locking rod with the movable mold carrier and to arrange the blocking mechanism, for example, on the support element 13.

The mechanical blocking mechanism B operates jointly with the blocking segment 16a of the locking rod 16. For this purpose, the locking rod 16 has annular ribs 16b at regular intervals, so that at any time during the movement, the movable mold carrier 11 can be fixed locally on the annular ribs 16b of the locking rod, if it becomes necessary.

Figure 3:
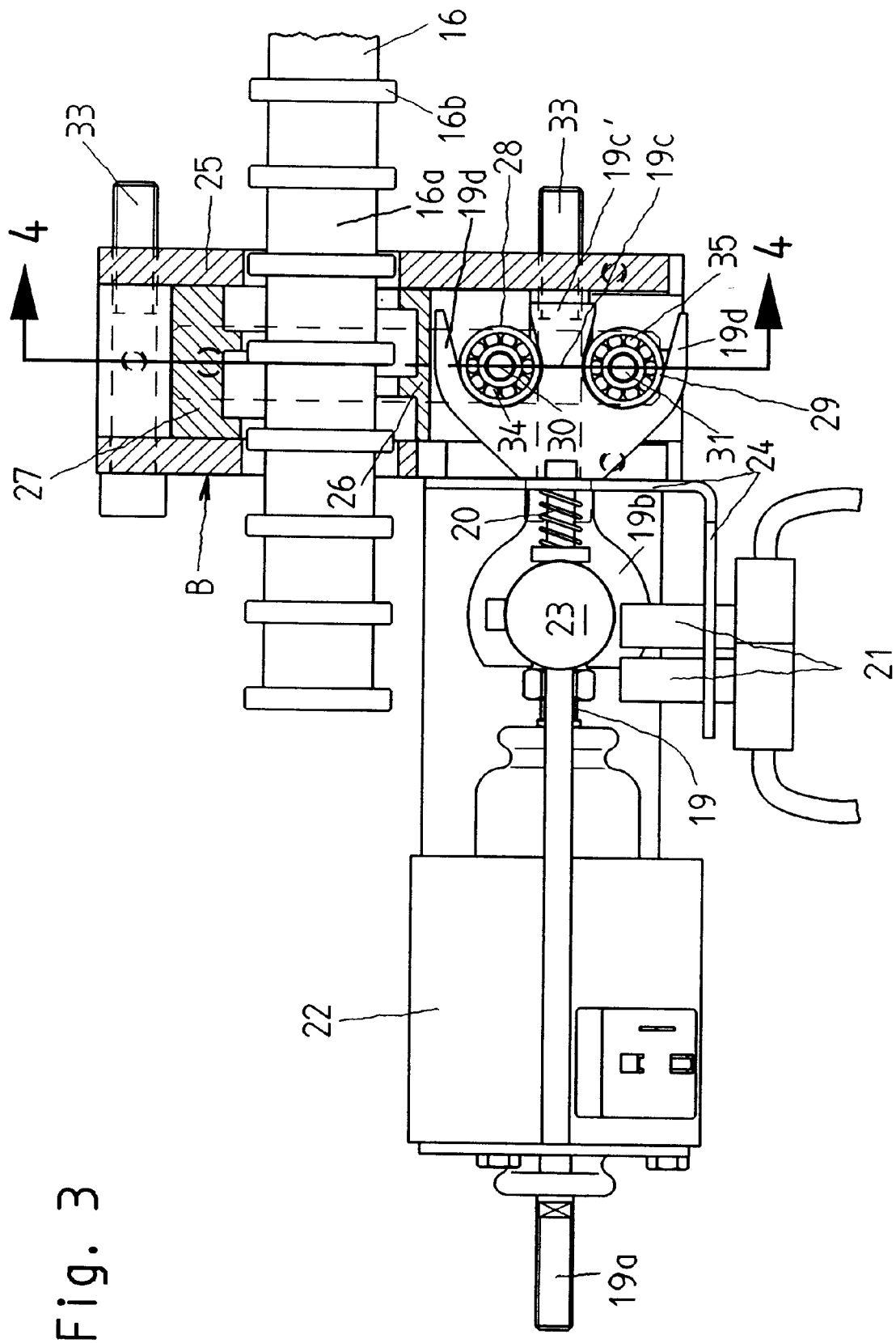
FIG. 3 is a side elevational view of an enlarged detail of FIG. 1 in the region of the blocking mechanism.

In FIG. 3, the locking jaws 26 and 27, which are designed as blocking means, are not in engagement with the locking rod 16. In such a non-blocking position, which is assumed against the force of elastic means 20, the locking rod 16 can be moved relative to the blocking means during a movement of the movable mold carrier. A control device forces the blocking means to engage in the blocking segment 16a of locking rod 16 if the protective device 15 is moved from the protecting position, and permits the movement of the locking rod 16, relative to the blocking mechanism B, if the protective device 15 is in the protecting position.

Figure 5:
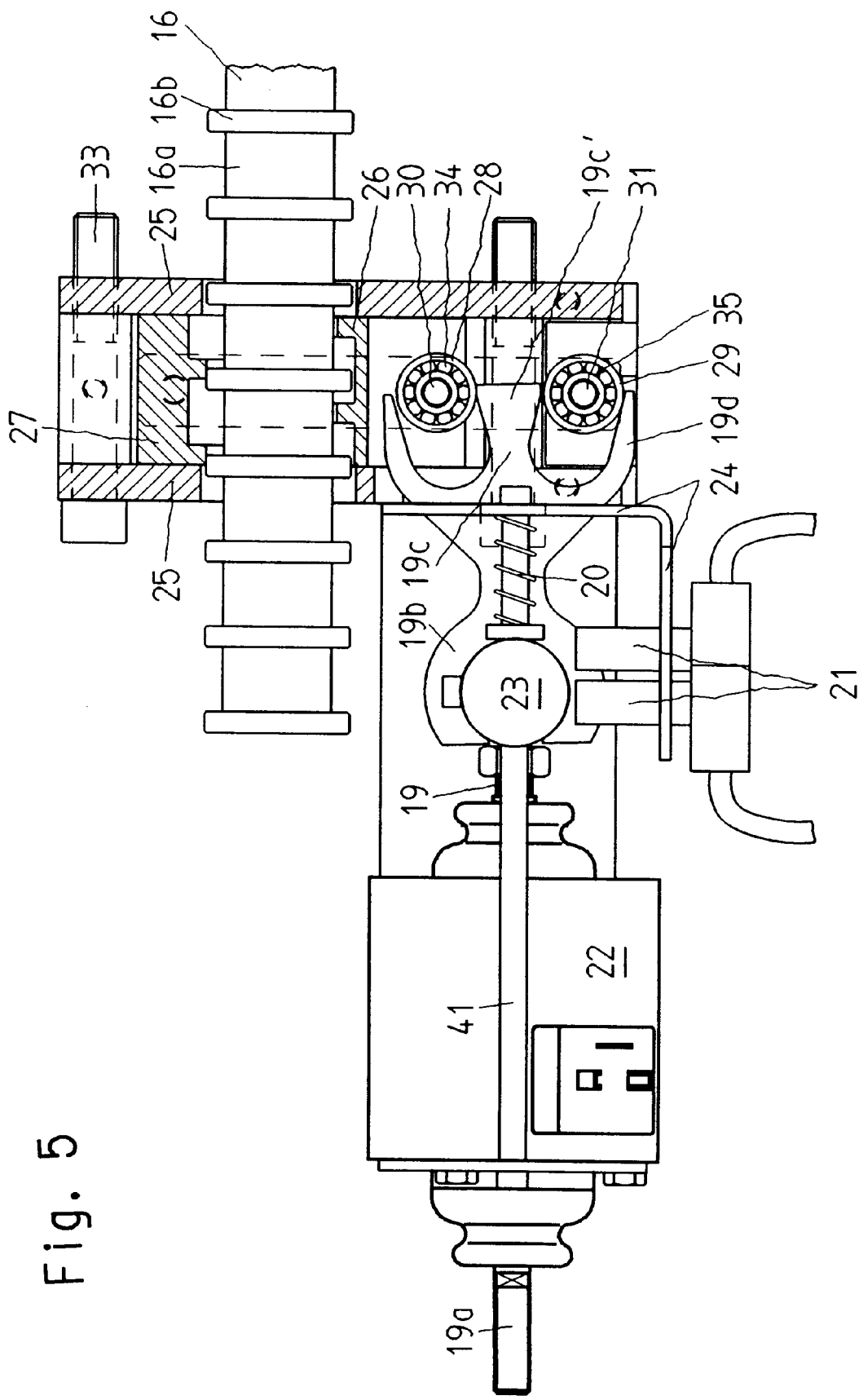
FIGS. 5 and 6 are representations according to FIG. 3, for which the locking rod is in the blocking position.
Figure 6:
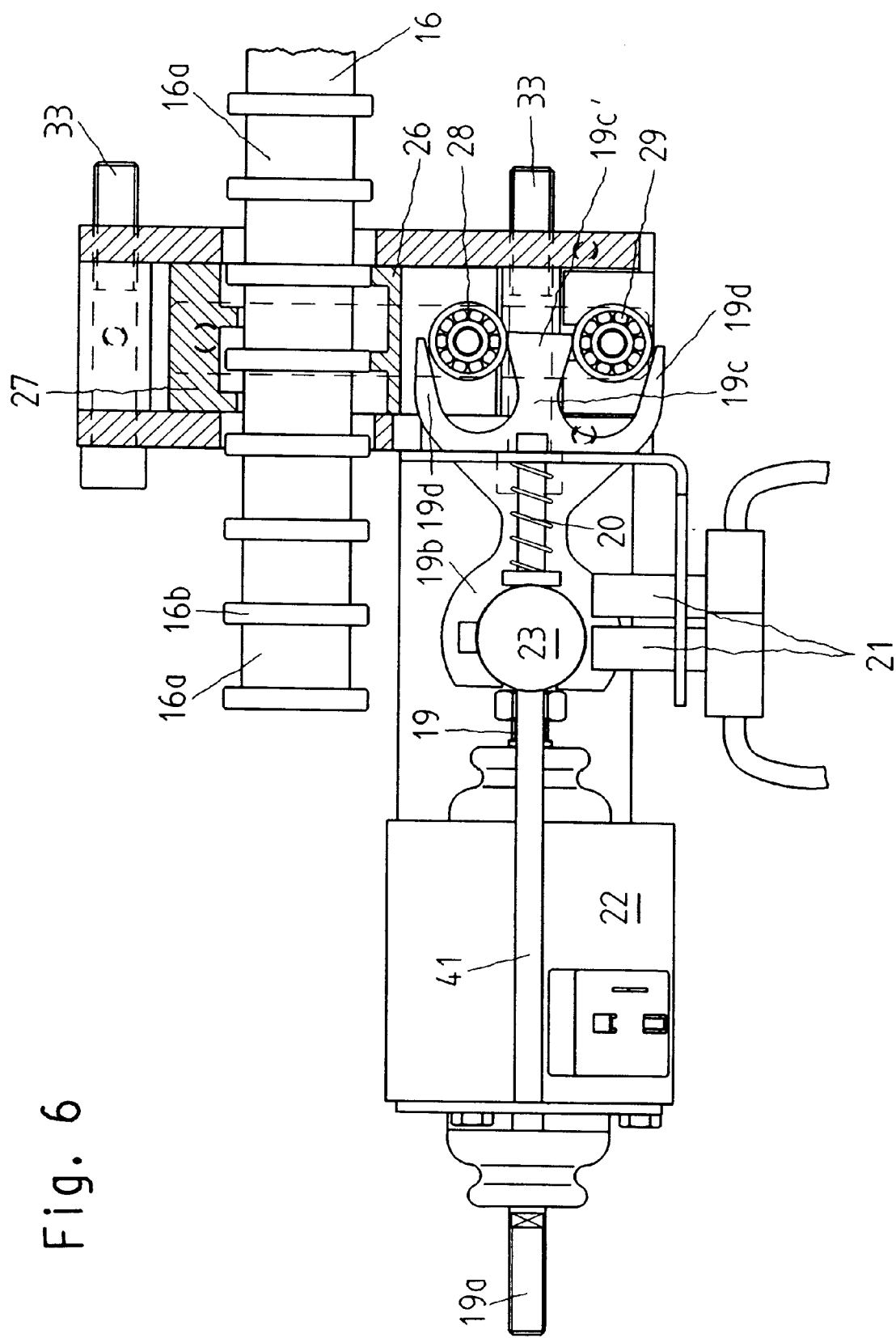

According to FIG. 1, an auxiliary control circuit 18 is provided as a control device. The auxiliary control circuit 18 has a sensor 17 in the form of a proximity switch, designed to detect whether the protective device 15 according to FIG. 1 is in the protecting position. As soon as the protective device 15 is moved out of the protecting position, the sensor 17 emits an electrical signal which is transmitted from the auxiliary control circuit to the control element 19 which forms part of the blocking mechanism B and which moves the blocking means into the blocking position as a result of the electrical signal and the force of the elastic means 20, as is shown in FIGS. 5 and 6. At the same time, however, the position of the control element 19 itself is monitored with position-monitoring means 21, so that multiple safety precautions are taken to ensure that the blocking mechanism is actually in the blocking position.

If the protective device 15 is in the protecting position, then the auxiliary control circuit at this point in time supplies current to a coil 22, in which an end region 19a of the control element 19 comes to rest in accordance with FIG. 3. The current causes a rightward movement of the control element 19 in FIG. 3, against the force of at least one elastic means (spring) 20. As a result, the control wheels 28, 29 come to rest in a region which ensures that the locking jaws 26, 27 are moved to a position according to FIG. 3. In this position, the locking jaws do not engage in the locking rod with their locking extensions, so that the locking rod 16 can move freely, relative to the blocking mechanism B.

The control element 19 has a frontal region 19b, which is additionally monitored by the position monitoring means 21 with respect to its position, as well as an end region 19a. Both regions are linked via a joint 23. The elastic means 20 are supported in the region of joint 23 as well as on a carrier element 24, which is connected to the housing 25 of blocking mechanism B and simultaneously functions as a holder for the position monitoring means 21.

Figure 4:
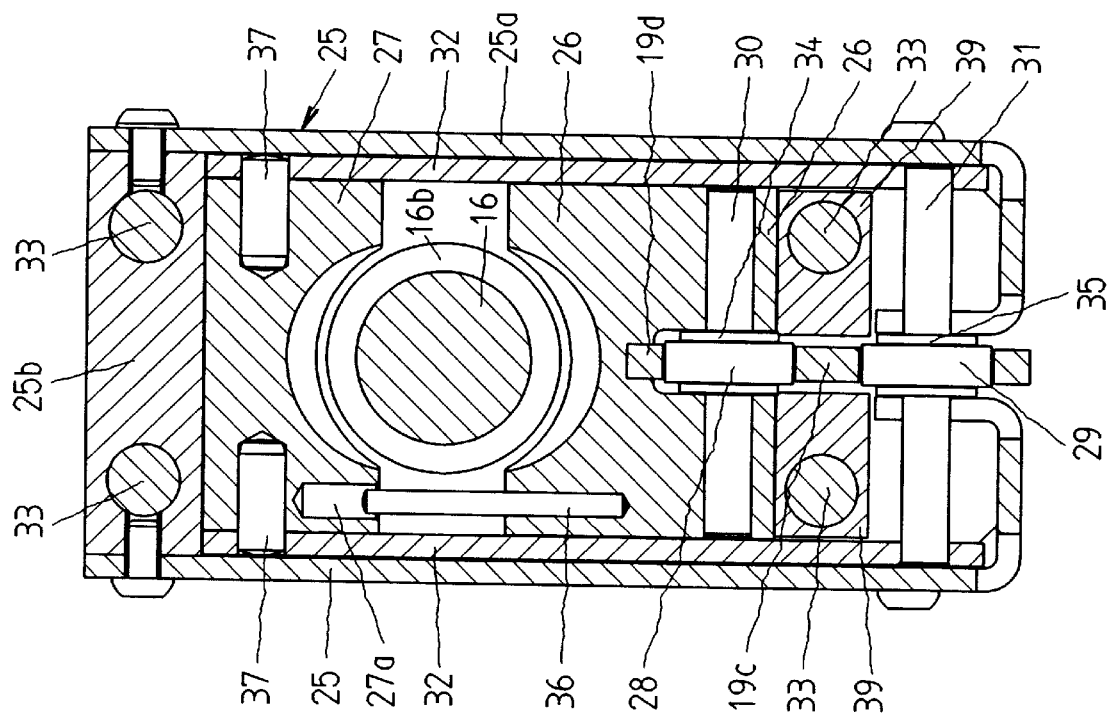
FIG. 4 is a section along the line 4—4 in FIG. 3.

FIGS. 3 and 4 illustrate the blocking mechanism as a whole. The actual blocking means are formed of two locking jaws 26, 27, arranged diametrically to the locking rod 16. For the blocking operation, the locking jaws grip with their locking extensions between the annular ribs 16b of locking rod 16 that are arranged at regular intervals. The locking jaws are actuated via two control wheels 28, 29, which are arranged on two ball bearings 34, 35 and are positioned such that they rotate on axles 30, 31. The axle 30 for the control wheel 28 closest to the locking rod 16 is positioned in the adjacent locking jaw 26, whereas the axle 31 for the other control wheel 29 is connected via transfer levers 32 with the other locking jaw 27. FIG. 4 shows that the axle 31 is positioned for this purpose in the transfer levers 32 which are located on the interior of the left and right sides of the housing 25 and which are linked via fastening means 37 to the locking jaw 27. A hinge pin 36 is provided on the locking jaw 26 to ensure that no jamming occurs during the locking movement. With its end facing away from the locking jaw 26, the hinge pin comes to rest inside a bore 27a of the other locking jaw. The transfer levers 32 can be moved relatively to the locking jaw 26.

All elements are positioned with play inside the housing 25 having two longitudinal sides 25a, which are bent in a U-shape at one end and thus limit the movement of the transfer lever 32 on the bottom side in FIG. 4. The two longitudinal sides are connected on the opposite side (top in FIG. 4) via a connecting block 25b, which simultaneously holds two of the fastening means 33, thus permitting the fastening of a blocking mechanism B to the movable mold carrier. Two additional fastening blocks 39 are provided between the axles 30, 31 for the control wheels, which also serve to hold two additional fastening means 33. The fastening blocks 39 are embraced from the right and left in FIG. 4 by the transfer levers 32. Further, the fastening blocks are, in the center, at a distance from one another, forming a space through which the center prong 19c of the control fork extends. The control fork forms the control element 19 with the prongs and a section of the frontal region 19b. The control wheel 28 is furthermore supported with its ball bearings 34 inside the locking jaw 26 which has a recess into which the outside-positioned prong 19d can enter. The other control wheel 29 with its ball bearing 35 is located between two integrally cast parts on the longitudinal sides 25a.

In accordance with FIG. 3, the control element 19 is a control fork. In the non-blocking position, the control wheels are located on the bottom of the recesses formed between the fork prongs. In the exemplary embodiment, the control fork has three prongs (a center prong 19c and two flanking prongs 19d) between which the two control wheels 28, 29 are positively guided. The center prong 19c has an enlargement 19c' on its end. The flanking prongs 19d extend at a uniform distance to the enlargement 19c' in order to achieve the positive guidance.

A comparison between FIGS. 3 and 5 shows the operation of the device. The blocking mechanism is moved from the non-blocking position to the blocking position as a result of switching off the current to coil 22. Consequently, there is no longer any actuating power for the control element 19, so that the elastic means 20 moves the control element leftward in the Figures, starting from the position according to FIG. 3 to the position according to FIG. 5. The control wheels 28, 29 at the same time roll off along the prongs. The enlargement 19c' together with the prongs 19d, which are bent toward the outside, causes the locking jaws to be moved toward each other. In FIG. 5, the bottom locking jaw 26 is thereby pushed between the annular ribs 16b of locking rod 16, while the locking jaw 27 on the top side only rests on the annular ribs. Nevertheless, a blocking has already occurred since the locking extensions for the locking jaws are displaced against each other. They are preferably arranged (staggered relative to one another) at a distance corresponding to half the distance between the annular ribs. The space between the locking jaw 27 and the fastening means 33 illustrates that the locking jaw 27 has only slightly moved, if at all, whereas the remaining distance to the blocking is traveled by the locking jaw 26. In the blocking position according to FIG. 6, on the other hand, the top locking jaw 27 is used for the blocking, while the bottom locking jaw 26 rests on the annular ribs 16b. Not only is the distance between the top locking jaw and the fastening means 33 greater, but the bottom prong 19d of the control element is pushed further toward the outside, as seen by a comparison with FIG. 5. The joint 23 is provided to permit this movement, which is caused by the suspended system arranged inside housing 25, since it is basically of no significance as to which locking jaw engages in the locking rod.

As a result of the positive guidance by the control fork, it is possible to forego the springs inside of the blocking mechanism, which until now have caused the resetting of the locking jaws, but which require an involved installation. The elastic means 20 arranged outside of the housing are the only elastic means and trigger the actual blocking movement.

Figure 7:
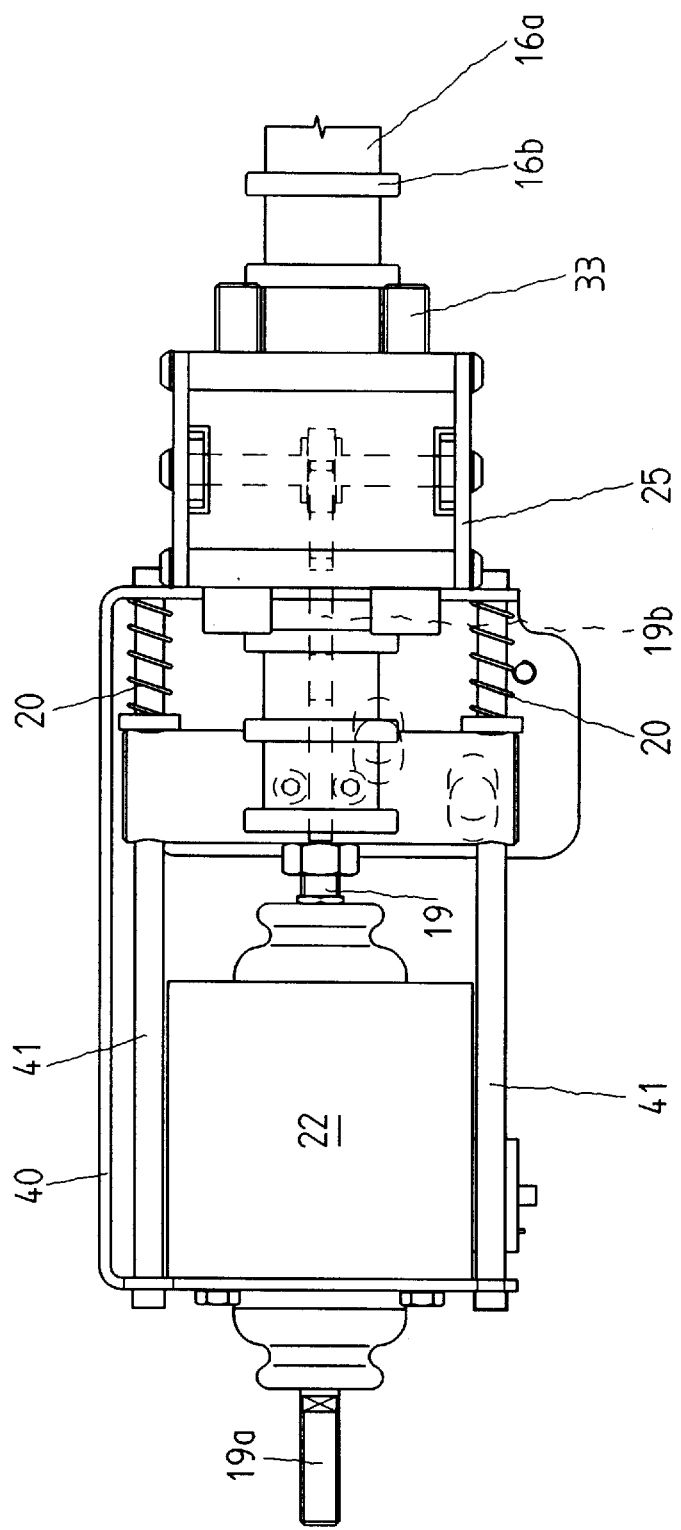
FIG. 7 is a top plan view of the blocking mechanism according to FIG. 3.

FIG. 7 shows the blocking mechanism in a state in which it is removed from the movable mold carrier 11, and illustrates that two elastic means 20 are arranged to the top and the bottom of the control element 19. The coil 22 as well as the guide elements 41 for the elastic means are positioned on a carrier element 40.

Figure 8:
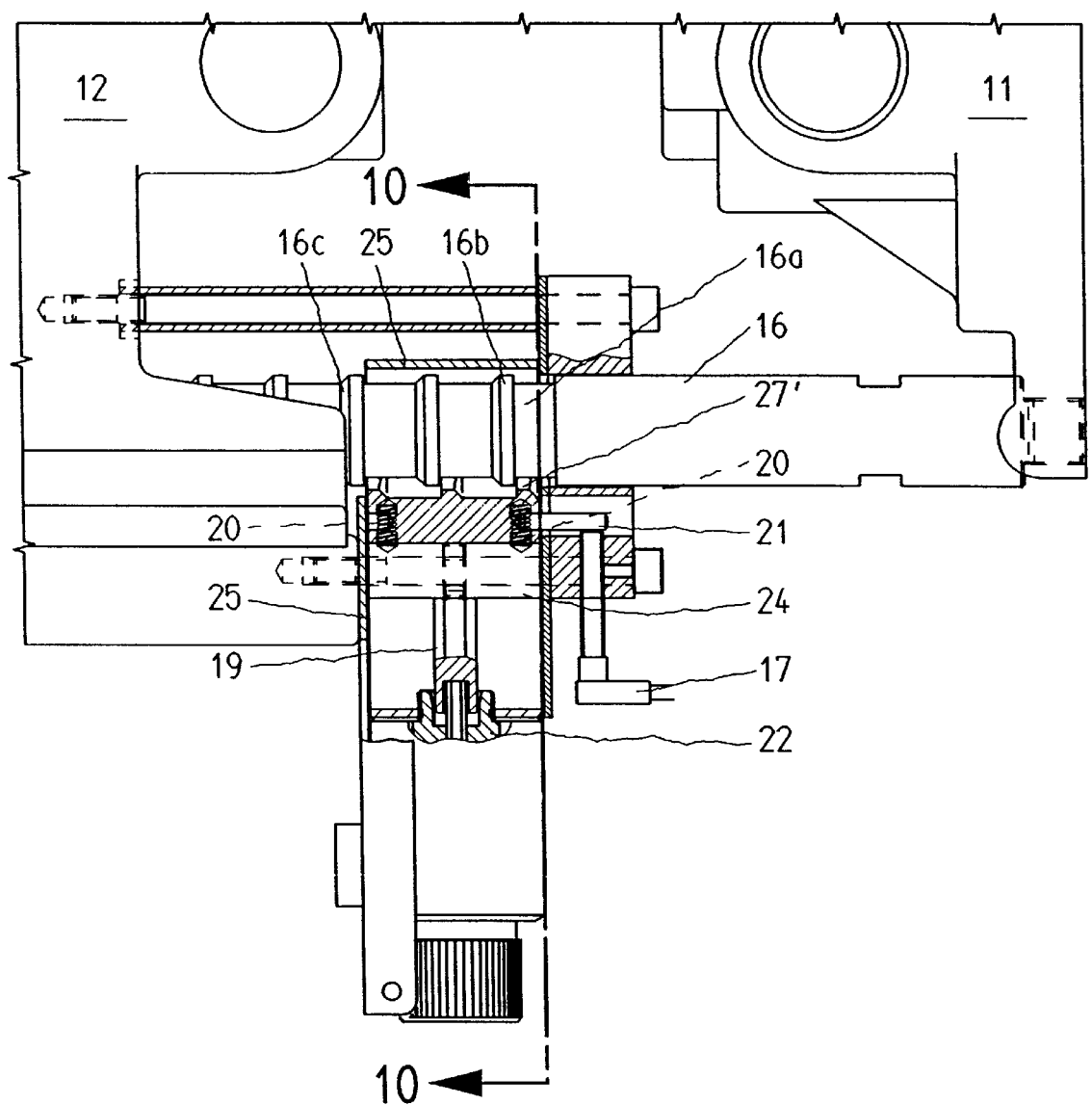
FIG. 8 is a top plan view of a blocking mechanism in a further embodiment in blocking position.
Figure 9:
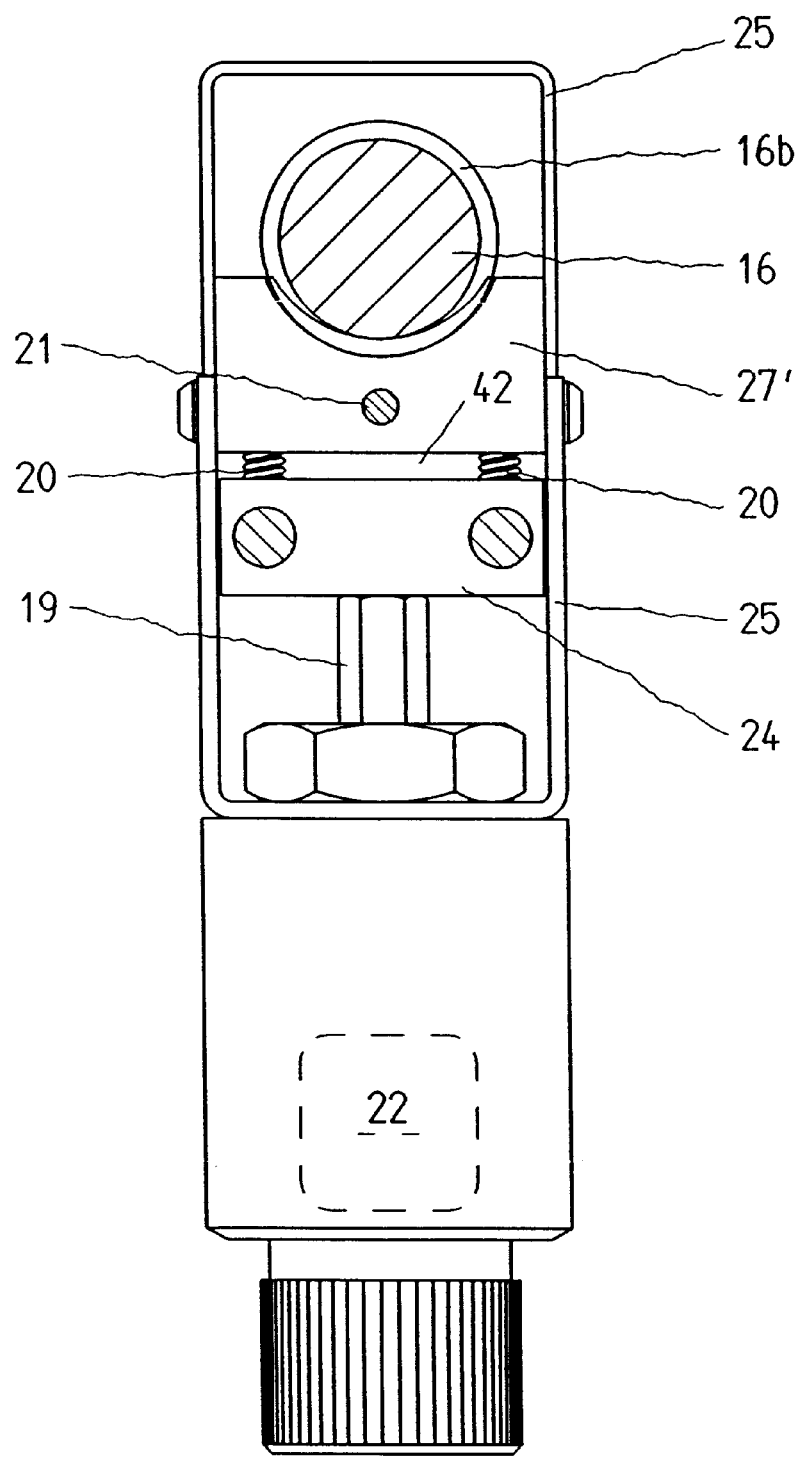
FIG. 9 is a section along the line 9—9 in FIG. 8.
Figure 10:
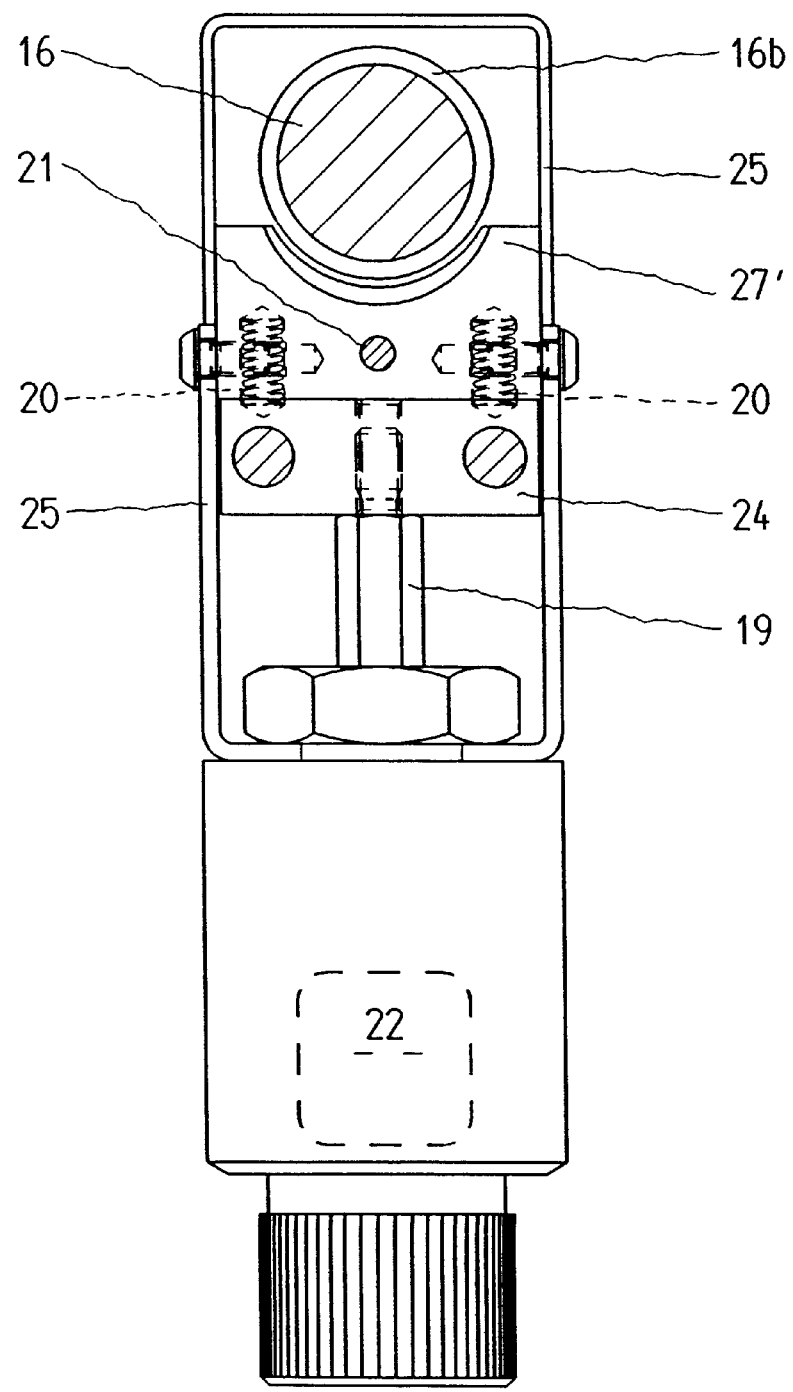
FIG. 10 is an illustration according to FIG. 9 in non-blocking position.

A further embodiment according to the invention is illustrated in FIGS. 8 to 10. This embodiment differs from the first embodiment of FIGS. 1 to 7 in that the control element 19 directly engages the blocking means 27. Hence, it is not necessary to first move a control element, which then via intermediate means engages the blocking means. A further advantage of the second embodiment according to FIGS. 8 to 10 resides in the fact that the position monitoring means 21 directly monitors the position of the blocking means. Therefore, the risk is eliminated that between the control means and the blocking jaws 27 a mechanical damage or destruction occurs, so that it is detected directly at the blocking mechanism whether or not all is satisfactory, thereby increasing the user's safety.

FIG. 8 shows a top plan view in the region of the locking rod 16. The control element 19 is engaged via a coil and, as in the first embodiment when no current passes the coil, the locking jaws 27' are in a blocking position according to FIG. 10. When the current to the coil is switched on, the control element 19 is forced out of the coil 22. As the control element 19 is fixed to the bearing element 24, this results in a movement downward in the Figures, so that the blocking jaw 27', which is fixed to the casing 25, is moved together with the casing 25 downward, so that it is transferred to its non-blocking position according to FIG. 10. FIG. 10 also shows that compared with FIG. 9 there is no longer a distance 42 between the blocking jaw 27' and the bearing element 24. Therefore, the current flowing through the coil depresses the springs 20 which can be well observed by a comparison between FIGS. 9 and 10. When the current is switched off, the elastic means will immediately press the blocking jaw 27' back into its blocking position, where it cooperates with the ribs 16b of the locking rod 16.

Compared with the first embodiment it is a further difference that there is only one blocking jaw 27' on one side of the locking rod 16. Even if two blocking jaws are advantageous, it has been found in practice that one blocking jaw is sufficient, as still a small movement is allowed. However, the ribs 16b differ in size from the ribs 16b of the first embodiment, as they have a rectangular edge facing in the direction of the stationary mold carrier 12, whereas they have an inclined surface 16c facing away from the stationary mold carrier 12. This inclination is an opening aid to bring the blocking jaw 27' out of its blocking position. It has to be assured by the rectangular edge, that as soon as the blocking jaw and ribs 16b cooperate, a fixed blocking position is achieved. However, to release such a blocking posit-on it is of advantage when the ribs, via the inclined surface, can also press away the blocking jaw 27' out of its blocking position.

It will be understood that the above description of the present invention is susceptible to various modifications, changes and adaptations, and the same are intended to be comprehended within the meaning and range of equivalents of the appended claims.

What is claimed is:

1. In a mechanical safety cover interlock for an injection-molding machine for the processing of plasticizable masses, including:
   a stationary mold carrier;
   a clamping unit;
   a movable mold carrier displaceable by the clamping unit in an axial direction parallel to a mold closing direction of the machine from and to a position of interlock with the stationary mold carrier;
   a mold clamping area extending between the movable mold carrier and the stationary mold carrier; in said mold clamping area parts of a mold can be fixed on the movable mold carrier or the stationary mold carrier;
   a support element, arranged behind the movable mold carrier as seen from the stationary mold carrier, for supporting the clamping unit for the movable mold carrier;
   force transmission elements for transmitting forces occurring in a closed position from the stationary mold carrier to the support element and to the movable mold carrier;
   a protective device covering the mold clamping area while in a protecting position and movable in the axial direction;
   a locking rod extending in the axial direction and including a blocking segment;
   a mechanical blocking mechanism operating jointly with the blocking segment of the locking rod and including blocking means for blocking movement of the movable mold carrier by engagement with the blocking segment; the blocking means being movable counter to the force of an elastic means to be in a non-blocking position and, when located in the non-blocking position, being movable relative to the locking rod during a movement of the movable mold carrier; and
   a control device positively engaging the blocking means with the blocking segment of the locking rod when the protective device is moved from the protecting position and permitting movement of the locking rod relative to the blocking mechanism when the protective device is in the protecting position;
   the improvement wherein the control device includes
   a sensor for detecting whether the protective device is in the protecting position and for emitting an electrical signal when the protective device is not in the protecting position;
   a control element for steering the blocking means into the blocking position in response to the electrical signal and the force of the elastic means; and
   a position monitoring means for monitoring the position of the control element.

2. The mechanical safety cover interlock according to claim 1, further comprising a coil and wherein the control element includes an end region arranged inside the coil; the coil, when supplied with current, moving the control element from the blocking position against the force of the elastic means.

3. The mechanical safety cover interlock according to claim 1, wherein the blocking mechanism includes a housing and a bearing element connected to the housing and supporting the position monitoring means; further wherein the control element comprises a frontal region, a joint and an end region connected to the frontal region via the joint, and the elastic means has one end supported in a region of the joint and another end supported by the bearing element.

4. The mechanical safety cover interlock according to claim 3, wherein the position monitoring means include means for detecting a position of the control element in the region of the joint.

5. The mechanical safety cover interlock according to claim 1, wherein the blocking mechanism is mounted on the movable mold carrier and the locking rod is attached to the stationary mold carrier and extends with said blocking segment through the blocking mechanism.

6. The mechanical safety cover interlock according to claim 1, wherein the locking rod includes annular ribs arranged at regular intervals; further wherein the blocking means comprise two locking jaws arranged diametrically to the locking rod and include contact surfaces displaced against each other in the direction of the locking rod; and further wherein the control element includes a joint and a frontal region deflectable about the joint in a movement direction of the locking jaws.

7. The mechanical safety cover interlock according to claim 1, wherein the blocking mechanism includes two control wheels; further wherein the control element comprises a control fork including fork prongs having a center prong with an enlarged end and outside prongs extending at a uniform distance from the center prong; the two control wheels being positively guided between the center fork prong and the respective outer fork prongs.

8. The mechanical safety cover interlock according to claim 7, wherein one of the control wheels includes an axle adjacent to the locking rod and positioned in an adjacent one of the locking jaws and the other of the control wheels includes an axle connected by transmission levers to the other locking jaw.

9. The mechanical safety cover interlock according to claim 1, wherein the elastic means comprises a spring.

10. The mechanical safety cover interlock according to claim 1, wherein the position monitoring means comprises at least one proximity switch.

11. In a mechanical safety cover interlock for an injection-molding machine for the processing of plasticizable masses, including a stationary mold carrier;

a clamping unit;

a movable mold carrier movable by the clamping unit in an axial direction parallel to a mold closing direction of the machine from and to a position of interlock with the stationary mold carrier;

a mold clamping area, extending between the movable mold carrier and the stationary mold carrier; in said mold clamping area parts of a mold can be fixed to the movable mold carrier or the stationary mold carrier;

a support element arranged behind the movable mold carrier as seen from the stationary mold carrier, for supporting the clamping unit for the movable mold carrier;

force transmission elements for transmitting forces occurring in a closed position from the stationary mold carrier to the support element and to the movable mold carrier;

a protective device covering the mold clamping area while in a protecting position and being movable in the axial direction;

a locking rod extending in the axial direction and including a blocking segment;

a mechanical blocking mechanism operating jointly with the blocking segment of the locking rod and including blocking means for blocking movement of the movable mold carrier by engagement with the blocking segment; the blocking means being movable counter to the force of an elastic means to be in a non-blocking position and, when located in the non-blocking position, being movable relative to the locking rod during a movement of the movable mold carrier; and a control device positively engaging the blocking means with the blocking segment of the locking rod when the protective device is moved from the protecting position and permitting the movement of the locking rod relative to the blocking mechanism when the protective device is in the protecting position;

the improvement wherein the control device includes a sensor for detecting whether the protective device is in the protecting position and for emitting an electrical signal when the protective device is not in the protecting position;

a control element for steering the blocking means into the blocking position in response to the electrical signal and the force of the elastic means; and a position monitoring means for monitoring the position of the blocking means.

12. The mechanical safety cover interlock according to claim 11, further comprising a coil and wherein the control element includes an end region arranged inside the coil; the coil, when supplied with current, moving the control element from the blocking position against the force of the elastic means.

13. The mechanical safety cover interlock according to claim 12, wherein the blocking mechanism includes a housing and a bearing element connected to the housing and supporting the position monitoring means; further wherein the control element comprises a frontal region connected to the blocking means and the end region connected to the frontal region; and further wherein the elastic means has one end supported in the frontal region at the blocking means and another end supported by the bearing element.

14. The mechanical safety cover interlock according to claim 11, wherein the blocking mechanism is mounted on the movable mold carrier and the locking rod is attached to the stationary mold carrier and extends with the blocking segment through the blocking mechanism.

15. The mechanical safety cover interlock according to claim 11, wherein the locking rod includes annular ribs arranged at regular intervals; and further wherein the blocking means comprises a locking jaw arranged diametrically to the locking rod.

16. The mechanical safety cover interlock according to claim 11, wherein the elastic means comprises a spring.

17. The mechanical safety cover interlock according to claim 11, wherein the position monitoring means comprises at least one proximity switch.

18. The mechanical safety cover interlock according to claim 11, wherein the control means is movable in a blocking direction transverse to the locking rod and is directly connected to the blocking means.

19. The mechanical safety cover interlock according to claim 15, wherein the annular ribs of the locking rod are rectangular in the direction facing the stationary mold carrier and have an inclination in the direction facing away from the stationary mold carrier.

* * * * *